US012375509B2

(12) United States Patent
Lu et al.

(10) Patent No.: US 12,375,509 B2
(45) Date of Patent: Jul. 29, 2025

(54) NETWORK INTRUSION DETECTING SYSTEM AND NETWORK INTRUSION DETECTING METHOD

(71) Applicant: Industrial Technology Research Institute, Hsinchu (TW)

(72) Inventors: Pei-Hsuan Lu, Hsinchu (TW); Pang-Chieh Wang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 275 days.

(21) Appl. No.: 17/986,917

(22) Filed: Nov. 15, 2022

(65) Prior Publication Data

US 2024/0129325 A1     Apr. 18, 2024

(30) Foreign Application Priority Data

Oct. 14, 2022 (TW) ................. 111139093

(51) Int. Cl.
*H04L 9/40* (2022.01)
*G06N 7/01* (2023.01)
*H04L 41/16* (2022.01)

(52) U.S. Cl.
CPC ........... *H04L 63/1425* (2013.01); *G06N 7/01* (2023.01); *H04L 41/16* (2013.01)

(58) Field of Classification Search
None
See application file for complete search history.

(56) References Cited

U.S. PATENT DOCUMENTS 11,303,666 B1    4/2022 Peters et al.
11,658,989 B1 *  5/2023 Ding ............... G06N 20/10
                                              726/23

(Continued)

FOREIGN PATENT DOCUMENTS

CN    109218321    1/2019
CN    114091020    2/2022

(Continued)

OTHER PUBLICATIONS

Bårli, Eirik & Yazidi, Anis & Herrera-Viedma, Enrique & Haugerud, Hårek. (2021). DoS and DDoS mitigation using Variational Autoencoders. Computer Networks. 199. 108399. 10.1016/j.comnet.2021. 10839 (Year: 2021).*

(Continued)

*Primary Examiner* — Alexander Lagor
*Assistant Examiner* — Felicia Farrow
(74) *Attorney, Agent, or Firm* — JCIPRNET (57) ABSTRACT

A network intrusion detecting system includes a network card configured to receive network traffic and a processor. The processor is configured to analyze the network traffic and extract traffic characteristics of the network traffic and confirm whether the network traffic is network traffic to be detected based on the traffic characteristics; input the network traffic to be detected into an automatic coding module to obtain a reconstructed sample and calculate a reconstruction error between the network traffic to be detected and the reconstructed sample; input the network traffic to be detected and the reconstructed sample respectively into at least one classification module and calculate a distribution similarity when the reconstruction error is less than a reconstruction error threshold; and input the network traffic to be detected into an intrusion anomaly classification model for network intrusion classification when the distribution (Continued)

similarity is less than a confidence distribution similarity threshold.

16 Claims, 6 Drawing Sheets

(56) References Cited

U.S. PATENT DOCUMENTS

2019/0188065 A1* 6/2019 Anghel ............... G06F 11/0778
2021/0012028 A1 1/2021 Cabot et al.

FOREIGN PATENT DOCUMENTS

TW 202135507 9/2021
WO 2017205850 11/2017

OTHER PUBLICATIONS

Amardeep Singh et al., "Autoencoder-based Unsupervised Intrusion Detection using Multi-Scale Convolutional Recurrent Networks", Apr. 7, 2022, available at: https://arxiv.org/pdf/2204.03779.pdf, pp. 1-12.

"Office Action of Taiwan Counterpart Application", issued on Apr. 28, 2023, p. 1-p. 3.

Mohammad J. Hashemi; et al., "Towards Evaluation of NIDSs in Adversarial Setting," Big-DAMA '19: Proceedings of the 3rd ACM CoNEXT Workshop on Big DAta, Machine Learning and Artificial Intelligence for Data Communication Networks, Dec. 2019, pp. 14-21.

Eirini Anthi; et al., "Adversarial attacks on machine learning cybersecurity defences in Industrial Control Systems," Journal of Information Security and Applications, vol. 58, 102717, May 2021, pp. 1-9.

Md. Ahsan Ayub; et al., "Model Evasion Attack on Intrusion Detection Systems using Adversarial Machine Learning," 2020 54th Annual Conference on Information Sciences and Systems (CISS), Mar. 18-20, 2020, pp. 1-6.

Christian Szegedy; et al., "Intriguing properties of neural networks," ICLR 2014 conference submission, Dec. 2013, pp. 1-10.

Jiawei Han; et al., "Data Mining: Concepts and Techniques, " Third Edition, 2012, Morgan Kaufmann, pp. 1-740.

Marek Pawlicki; et al., "Defending network intrusion detection systems against adversarial evasion attacks," Future Generation Computer Systems, vol. 110, Sep. 2020, pp. 148-154.

* cited by examiner

NETWORK INTRUSION DETECTING SYSTEM AND NETWORK INTRUSION DETECTING METHOD

CROSS-REFERENCE TO RELATED APPLICATION

This application claims the priority benefit of Taiwan application serial no. 111139093, filed on Oct. 14, 2022. The entirety of the above-mentioned patent application is hereby incorporated by reference herein and made a part of this specification.

TECHNICAL FIELD

The disclosure relates to a network intrusion detection technology, and in particular to a network intrusion detecting method and a network intrusion detecting system.

BACKGROUND

A conventional network intrusion anomaly detection system can issue alerts when suspicious malicious behavior is detected on the network. With the advancement of artificial intelligence technology, machine learning can help the system to improve accuracy and perform better analysis to discover known or unknown attacks. However, there are weaknesses in the application of machine learning, for example, adversarial evasion attacks can significantly reduce the accuracy of intrusion anomaly detection, i.e., network intrusion anomaly detection systems may mistakenly detect malicious traffic as benign, and attackers can use this technique to effectively circumvent intrusion detection systems.

In addition, existing network intrusion detection techniques may require a large number of diverse samples to create valid sample data or event lists, or consume a lot of computing resources to continuously retrain predictive models, all of which take a lot of time and resources.

Therefore, strengthening the defense mechanism in network intrusion anomaly detection can mitigate the evasion attacks, achieve the detection and blocking before and during the event, and enhance the trustworthiness of network intrusion anomaly detecting system.

SUMMARY

One of exemplary embodiments provides a network intrusion detecting system. The network intrusion detecting system includes a network card and a processor. The network card is configured to receive network traffic. The processor is coupled to the network card and has an automatic coding module and at least one classification module. The processor is configured to: analyze the network traffic and extract traffic characteristics of the network traffic, and confirm whether the network traffic is network traffic to be detected based on the traffic characteristics; input the network traffic to be detected into the automatic coding module to obtain a reconstructed sample, and calculate a reconstruction error between the network traffic to be detected and the reconstructed sample; input the network traffic to be detected and the reconstructed sample respectively into the at least one classification module and perform probability distribution difference detection to calculate distribution similarity when the reconstruction error is less than a reconstruction error threshold; and input the network traffic to be detected into an intrusion anomaly classification model for network intrusion classification when the distribution similarity is less than a confidence distribution similarity threshold.

One of exemplary embodiments provides a network intrusion detecting method. The network intrusion detecting method is suitable for a computer device having a network card and a processor. The network card is configured to receive network traffic, and the processor is configured to execute the network intrusion detecting method on the network traffic. The network intrusion detecting method includes the following. The network traffic is analyzed and traffic characteristics of the network traffic are extracted, and whether the network traffic is network traffic to be detected is confirmed based on the traffic characteristics. The network traffic to be detected is input into an automatic coding module to obtain a reconstructed sample, and a reconstruction error between the network traffic to be detected and the reconstructed sample is calculated. The network traffic to be detected and the reconstructed sample are input respectively into at least one classification module and probability distribution difference detection is performed to calculate distribution similarity when the reconstruction error is less than a reconstruction error threshold. The network traffic to be detected is input into an intrusion anomaly classification model for network intrusion classification when the distribution similarity is less than a confidence distribution similarity threshold.

Based on the above, the network intrusion detecting system and the network intrusion detecting method of the disclosure may filter each of the network traffic through two stages of detection before prediction of the original intrusion anomaly classification model, and carry out malicious unknown traffic screening to enhance the system's resistance to evasion attacks and increase the trustworthiness of the anomaly detection system.

Several exemplary embodiments accompanied with figures are described in detail below to further describe the disclosure in details.

BRIEF DESCRIPTION OF THE DRAWING

The accompanying drawings are included to provide further understanding, and are incorporated in and constitute a part of this specification. The drawings illustrate exemplary and, together with the description, serve to explain the principles of the disclosure.

DETAILED DESCRIPTION OF DISCLOSED EMBODIMENTS

Some of the embodiments of the disclosure will be described in detail with the accompanying drawings. The reference numerals used in the following description will be regarded as the same or similar components when the same reference numerals appear in different drawings. These embodiments are only a part of the disclosure, and do not disclose all of the ways in which this disclosure can be implemented.

Figure 1:
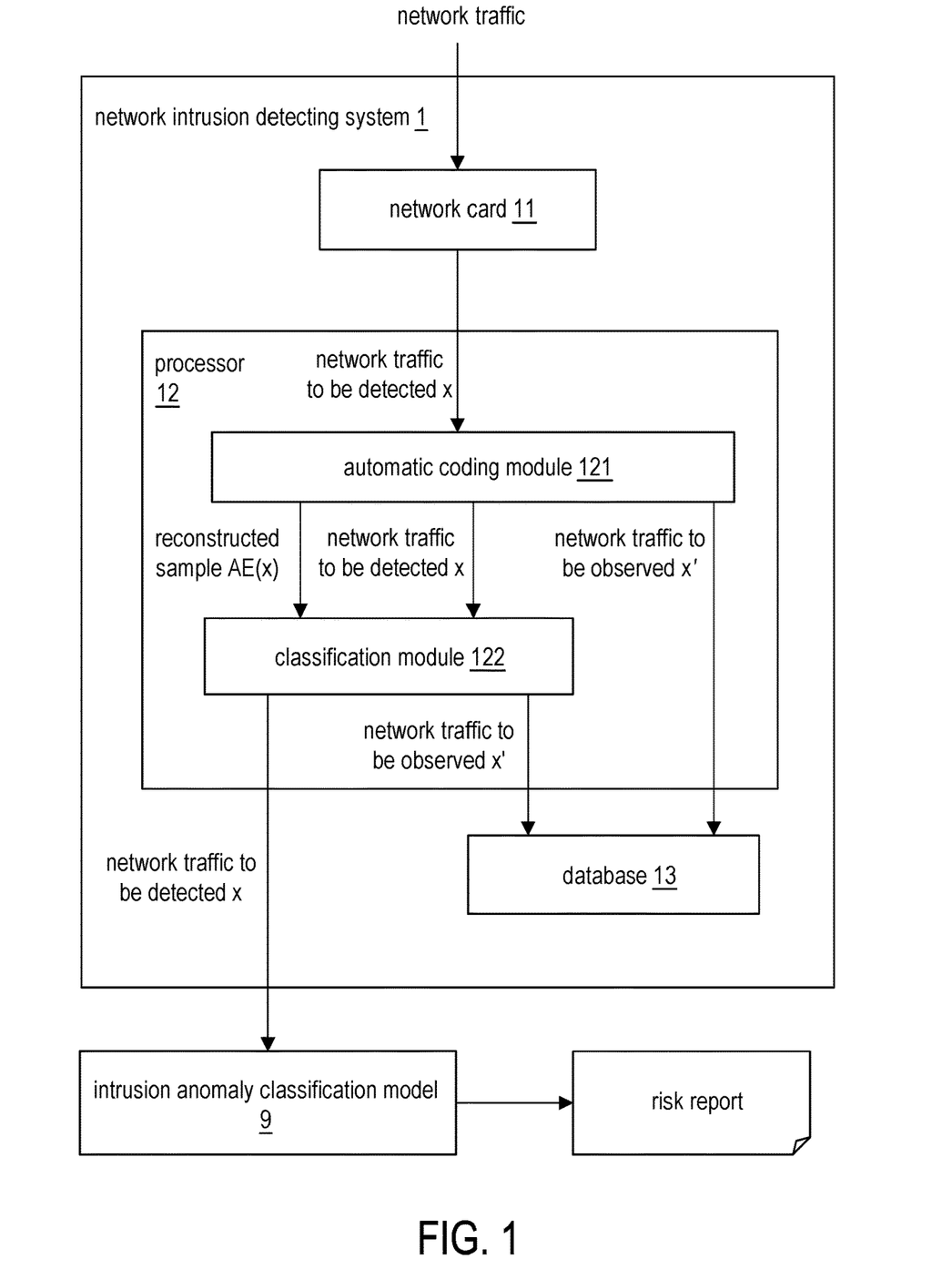
FIG. 1 is an architecture diagram illustrating a network intrusion detecting system according to an embodiment of the disclosure.

FIG. 1 is an architecture diagram illustrating a network intrusion detecting system 1 according to an embodiment of the disclosure. Referring to FIG. 1, the network intrusion detecting system 1 includes a network card 11 and a processor 12. The network card 11 is configured to receive network traffic; the processor 12 is coupled to the network card 11. In practice, the network intrusion detecting system 1 may be implemented by computer devices, such as desktop computers, notebook computers, tablet computers, workstations and other computer devices with computing functions, display functions, and network functions, which is not limited in the disclosure. The network card 11 is, for example, any type of wireless network interface module that supports Wi-Fi standard or other wireless transmission functions, or any type of wired network interface module that supports Ethernet, optical fiber, or other wired transmission functions. In addition, the processor 12 may be a central processor (CPU), a micro-processor, or an embedded controller, which is not limited in the disclosure.

The processor 12 has an automatic coding module 121 (for example, autoencoder) and at least one classification module 122, and the processor 12 controls overall operation of the automatic coding module 121 and the classification module 122. For example, after the network card 11 receives the network traffic, the network traffic is sent to the processor 12, and intrusion detection of the network traffic is performed through the operation of the automatic encoding module 121 and the classification module 122.

In one embodiment, the network intrusion detecting system 1 further includes a database 13 coupled to the processor 12 to store network traffic to be observed (to be described in detail later). In practice, the database 13 may be a storage medium such as memory, random-access memory (RAM), or hard disk drive (HDD), which is not limited in the disclosure.

Figure 2:
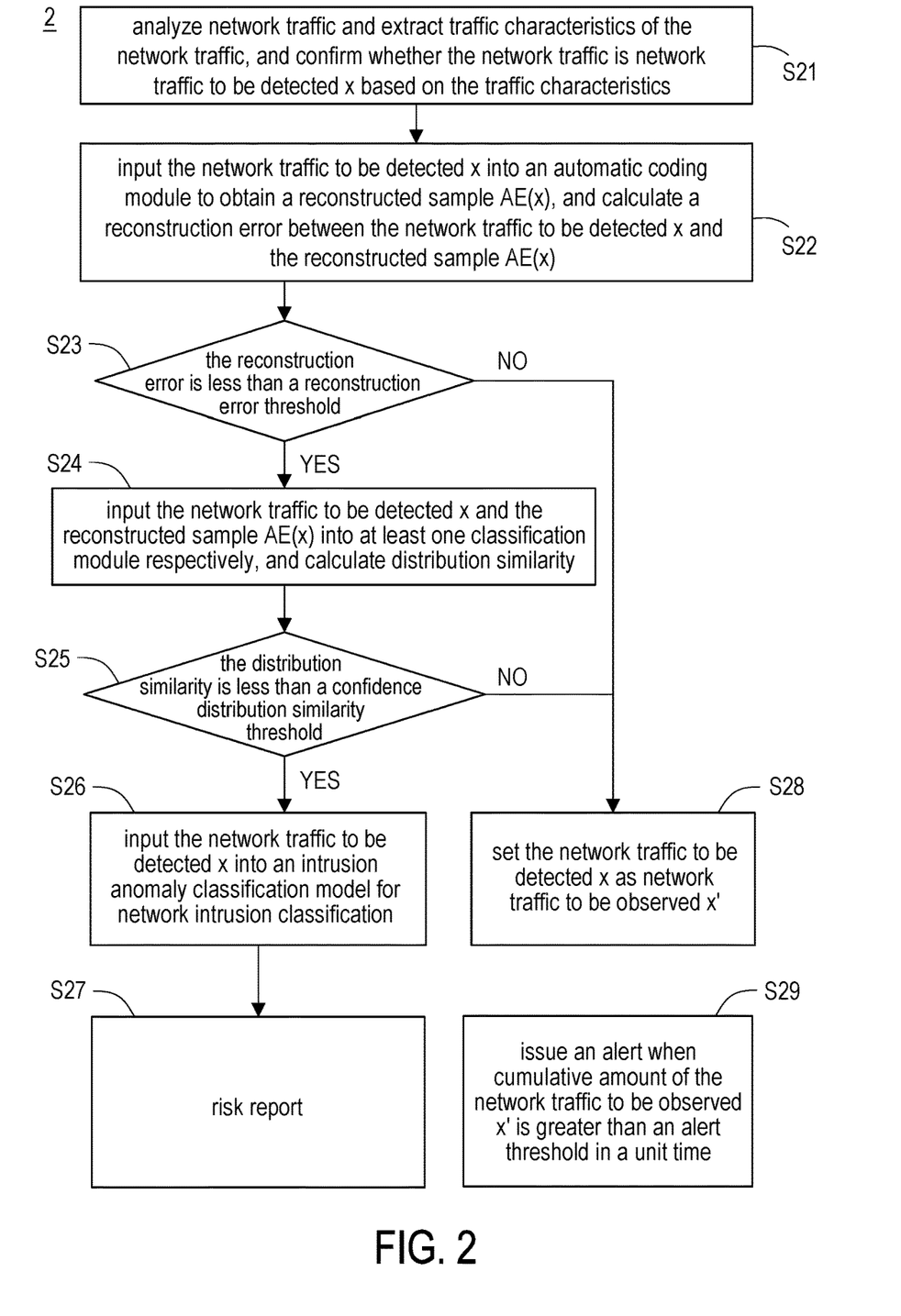
FIG. 2 is a flowchart illustrating a network intrusion detecting method according to an embodiment of the disclosure.

FIG. 2 is a flowchart illustrating a network intrusion detecting method 2 according to an embodiment of the disclosure. The network intrusion detecting method 2 includes step S21 to step S29. Referring to FIG. 1 and FIG. 2 at the same time, first, in step S21, the processor 12 analyzes the network traffic and extracts traffic characteristics of the network traffic, and confirms whether the network traffic is network traffic to be detected x based on the traffic characteristics. The network traffic includes many network packets, and the processor 12 may analyze data in the network packets and perform feature engineering, such as extracting traffic characteristics through coding transform, normalization, filtering missing values, etc., and then confirm whether the network traffic is the network traffic to be detected x based on the extracted traffic characteristics.

In step S22, the processor 12 inputs the network traffic to be detected x into the automatic coding module 121 to obtain a reconstructed sample AE(x), and calculates a reconstruction error between the network traffic to be detected x and the reconstructed sample AE(x). Next, the following describes the operation of the automatic coding module 121.

Figure 3:
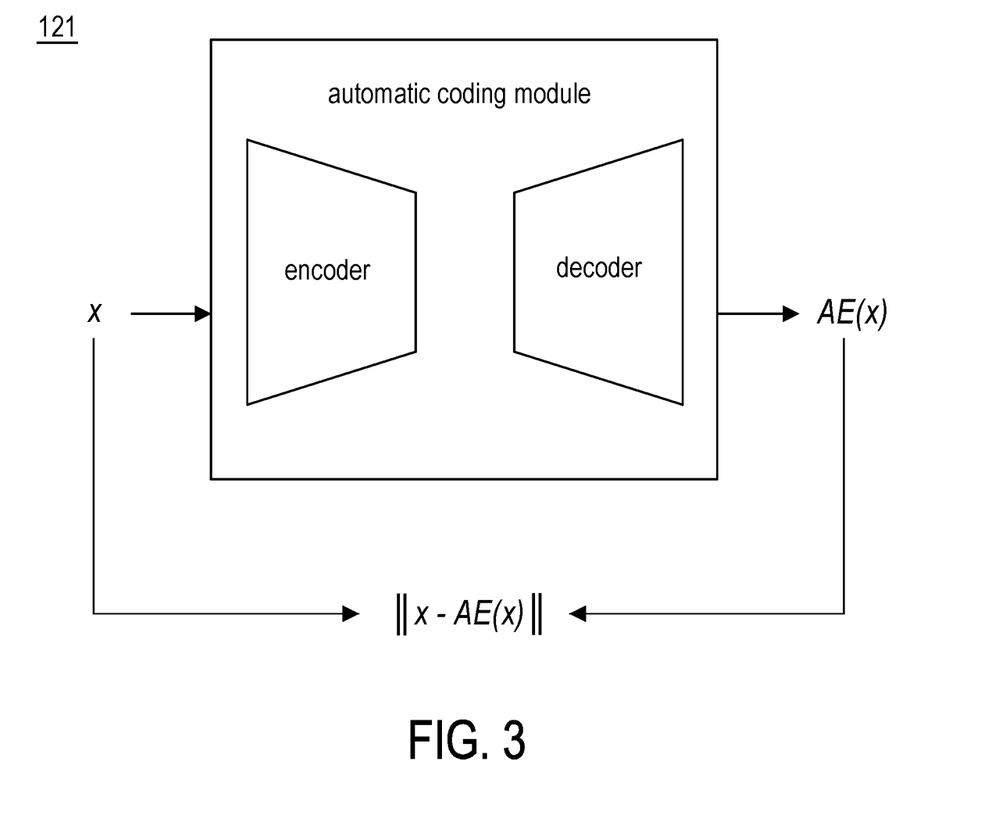
FIG. 3 is a schematic diagram illustrating an automatic coding module according to an embodiment of the disclosure.

FIG. 3 is a schematic diagram illustrating an automatic coding module 121 according to an embodiment of the disclosure. The automatic coding module 121 shown in FIG. 3 may be a mechanism for implementing a model generation through a combination of an encoder and a decoder. The automatic coding module 121 may generate multiple estimated reconstructed samples corresponding to multiple verification data respectively according to the verification data. The verification data may include multiple normal network traffic. The automatic coding module 121 may calculate multiple reconstruction errors according to the verification data and the estimation data, and set one of the reconstruction errors as a reconstruction error threshold.

Once the processor 12 trains the automatic coding module 121 through normal examples and obtains the reconstruction error threshold, the processor 12 inputs the network traffic to be detected x to the trained automatic coding module 121 to obtain the reconstructed sample AE(x), and calculates a reconstruction error x-AE(x) between the network traffic to be detected x and the reconstructed sample AE(x).

Back to FIG. 1 and FIG. 2, in step S23, the processor 12 determines whether the reconstruction error $\|x-AE(x)\|$ is less than the reconstruction error threshold, i.e., a first stage test. If the reconstruction error $\|x-AE(x)\|$ is less than the reconstruction error threshold, the network traffic to be detected x passes the first stage test, which means that the network traffic to be detected x may be normal network traffic. On the contrary, if the reconstruction error $\|x-AE(x)\|$ is not less than the reconstruction error threshold, the network traffic to be detected x does not pass the first stage test, which means that the network traffic to be detected x may be abnormal network traffic.

If the reconstruction error $\|x-AE(x)\|$ is less than the reconstruction error threshold, the network traffic to be detected x passes the first stage test, which also means that the network traffic to be detected x may be normal network traffic. In step S24, the processor 12 inputs the network traffic to be detected x and the reconstructed sample AE(x) that have passed the first stage test into the at least one classification module 122 respectively, and calculates the distribution similarity. The classification module 122 may be a machine learning classifier (e.g., random forest classifier, Adaboost classifier, etc.), a deep learning classifier (e.g., deep neural network classifier). Next, the following describes the operation of the classification module 122. In step S25, the processor 12 determines whether the distribution similarity is less than a confidence distribution similarity threshold, i.e., a second stage test.

If the network traffic to be detected x is abnormal network traffic including adversarial examples, the adversarial examples will mislead the classifier, i.e., it is not possible to classify the type of abnormal network intrusion by the classifier alone. Therefore, this disclosure calculates distribution similarity JSD between traffic classification probability f(x) of the network traffic and sample classification probability f(AE(x)) of the reconstructed sample by JS divergence (Jensen-Shannon divergence) after the network traffic and reconstructed sample are input into the classification module to measure similarity of probability distribution If the distribution similarity JSD is less than the confidence distribution similarity threshold, the network traffic to be detected x passes the second phase test, which also means that the network traffic to be detected x belongs to normal network traffic. On the contrary, if the distribution similarity JSD is not less than the confidence distribution similarity threshold, it means that the network traffic to be detected x belongs to abnormal network traffic including adversarial examples.

Figure 4:
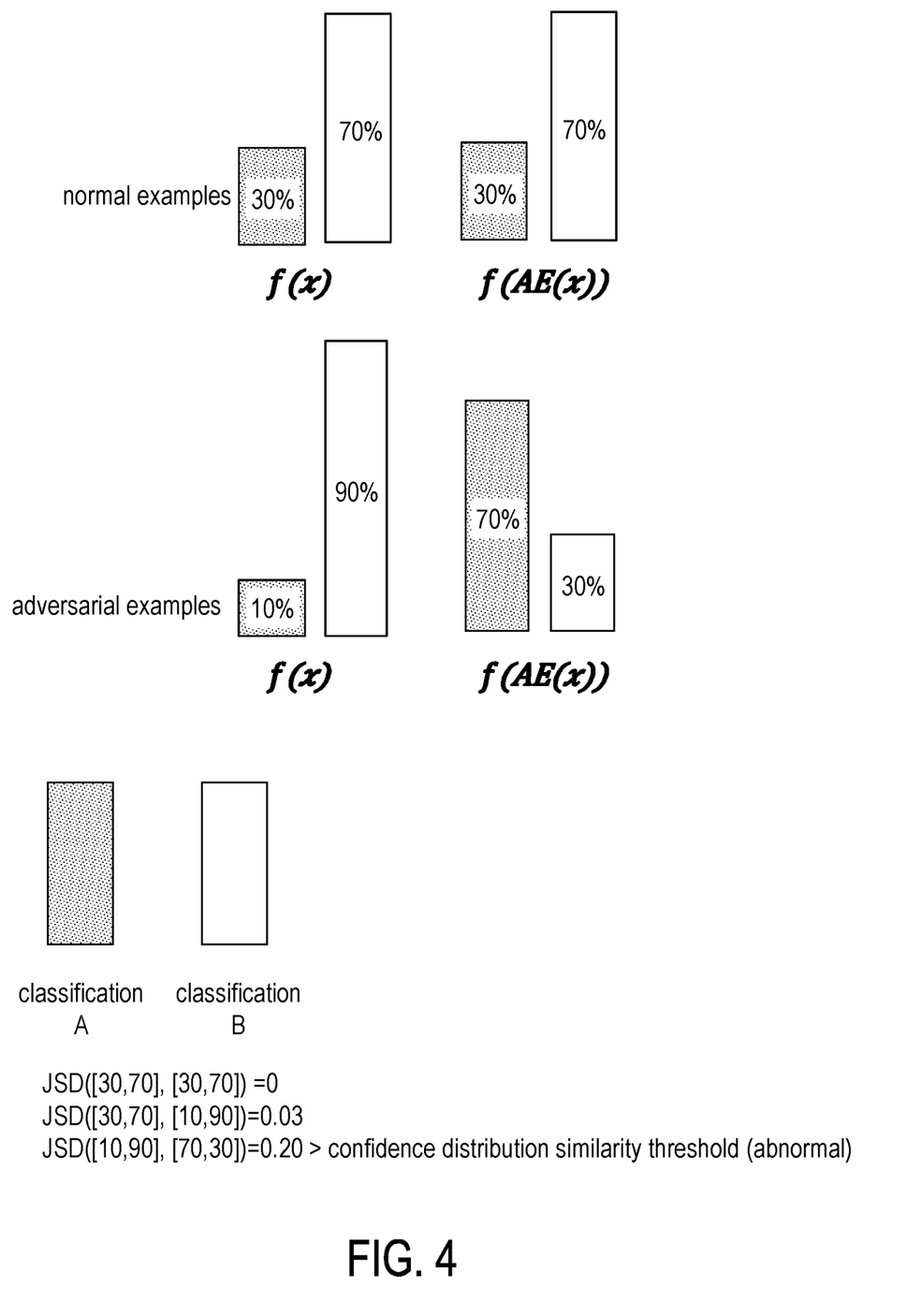
FIG. 4 is a schematic diagram illustrating calculation of distribution similarity according to an embodiment of the disclosure.

FIG. 4 is a schematic diagram illustrating calculation of distribution similarity according to an embodiment of the disclosure. In one embodiment, the processor 12 trains the classification module 122 in advance with historical normal network traffic and normal reconstructed samples, and obtains the confidence distribution similarity threshold. For example, in FIG. 4, the processor 12 inputs the network traffic to be detected x into the classification module and obtains the traffic classification probability f(x) of 30% and 70% for classification A and classification B, respectively. The processor 12 then inputs the reconstructed sample AE(x) of the network traffic to be detected x into the classification module 122 to obtain the sample classification probability f(AE(x)) of 30% and 70% for classification A and classification B, respectively. The distribution similarity is determined by the traffic classification probability f(x) of the network traffic to be detected x output by the classification module 122 and the sample classification probability f(AE(x)) of the reconstructed sample AE(x) of the network traffic to be detected x output by the classification module 122. The distribution similarity JSD ([30, 70], [30, 70])=0 between the traffic classification probability f(x) of the network traffic to be detected x and the sample classification probability f(AE(x)) of the reconstructed sample AE(x) of the network traffic to be detected x is less than the confidence distribution similarity threshold, then the processor 21 may conclude that the network traffic to be detected x is normal network traffic.

In one embodiment, the processor 12 inputs another network traffic to be detected x into the classification module 122 and obtains the traffic classification probability f(x) of 10% and 90% for classification A and classification B, respectively. The processor 12 then inputs the reconstructed sample AE(x) of the another network traffic to be detected x into the classification module 122 to obtain the sample classification probability f(AE(x)) of 70% and 30% for classification A and classification B, respectively.

The distribution similarity is determined by the traffic classification probability f(x) of the network traffic to be detected x output by the classification module 122 and the traffic classification probability f(x) of the another network traffic to be detected x output by the classification module 122. The distribution similarity JSD ([30, 70], [30, 70])=0 between the traffic classification probability f(x) of the network traffic to be detected x and the traffic classification probability f(x) of the another network traffic to be detected x is less than the confidence distribution similarity threshold, then the processor 21 may conclude that the another network traffic to be detected x is normal network traffic. The distribution similarity is determined by the traffic classification probability f(x) of the another network traffic to be detected x output by the classification module 122 and the sample classification probability f(AE(x)) of the reconstructed sample AE(x) of the another network traffic to be detected x output by the classification module 122. The distribution similarity JSD ([10, 90], [70, 30])=0.20 between the traffic classification probability f(x) of the another network traffic to be detected x and the sample classification probability f(AE(x)) of the another network traffic to be detected x is greater than the confidence distribution similarity threshold, then the processor 21 may conclude that the another network traffic to be detected x is abnormal network traffic including adversarial examples.

Back to FIG. 1 and FIG. 2, in step S26, when the distribution similarity JSD is less than the confidence distribution similarity threshold, i.e., the network traffic to be detected x has passed the first stage test and the second stage test, then the processor 12 inputs the network traffic to be detected x into an intrusion anomaly classification model 9 for network intrusion classification. Common intrusion anomaly classification models include DNN, CNN, LSTM, DECISION TREE, RANDOM FOREST, etc. In step S27, the intrusion anomaly classification model 9 generates a risk report based on the network traffic to be detected x that has passed the first stage test and the second stage test, providing maintenance personnel to perform malicious unknown traffic screening.

Back to step S23, if the processor 12 determines that the reconstruction error $\|x-AE(x)\|$ about the network traffic to be detected x is not less than the reconstruction error threshold, i.e., the network traffic to be detected x does not pass the first stage test, in step S28, the processor 12 inputs the network traffic to be detected x into the database 13, and sets the network traffic to be detected x as network traffic to be observed x'.

Similarly, in step S25, if the processor 12 determines that the distribution similarity JSD between the traffic classification probability f(x) of network traffic to be detected x and the sample classification probability f(AE(x)) of the reconstructed sample of the network traffic to be detected x is not less than the confidence distribution similarity threshold, i.e., the network traffic to be detected x does not pass the second stage test, in step S28, the processor 12 inputs the network traffic to be detected x to the database 13, and sets the network traffic to be detected x as the network traffic to be observed x'.

In step S29, when cumulative amount of the network traffic to be observed x' in the database 13 is greater than an alert threshold in a unit time, the processor 12 issues an alert to alert the maintenance personnel. In one embodiment, the network intrusion detecting system 1 may determine whether the network traffic to be observed x' is abnormal traffic continuously sent from a fixed IP based on the IP address in the network traffic to be observed x', and if the amount of abnormal traffic has exceeded a tolerance level, the network intrusion detecting system 1 sends a warning signal to the maintenance personnel.

Figure 5:
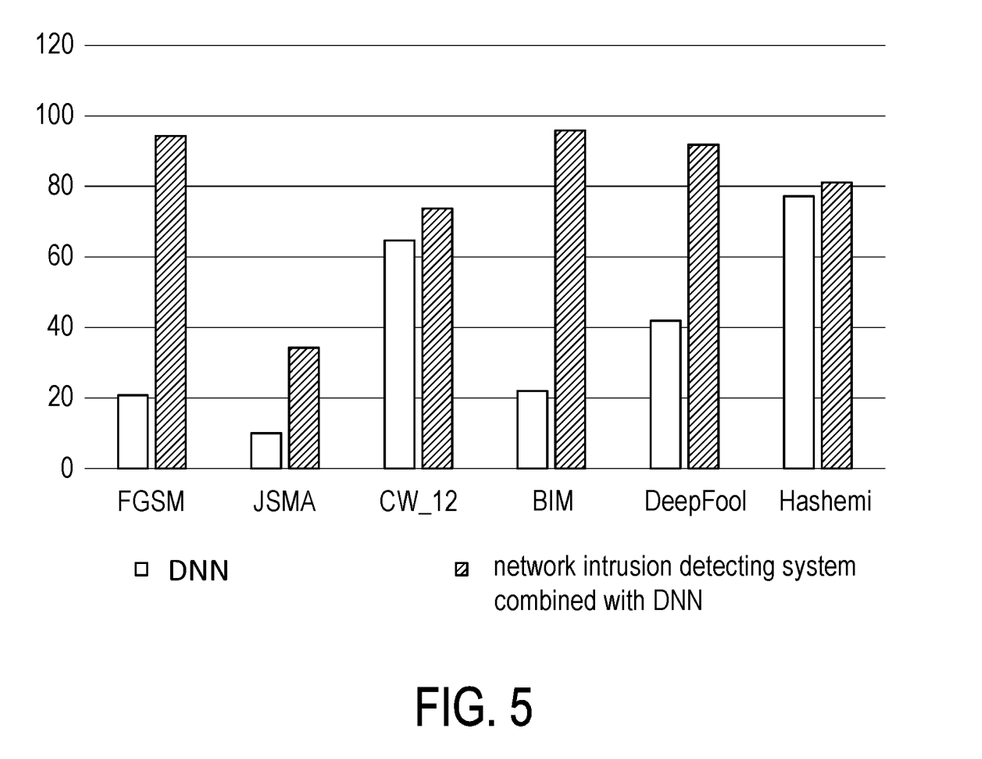
FIG. 5 is a schematic diagram illustrating a network intrusion detecting system combined with an intrusion anomaly model according to an embodiment of the disclosure.
Figure 6:
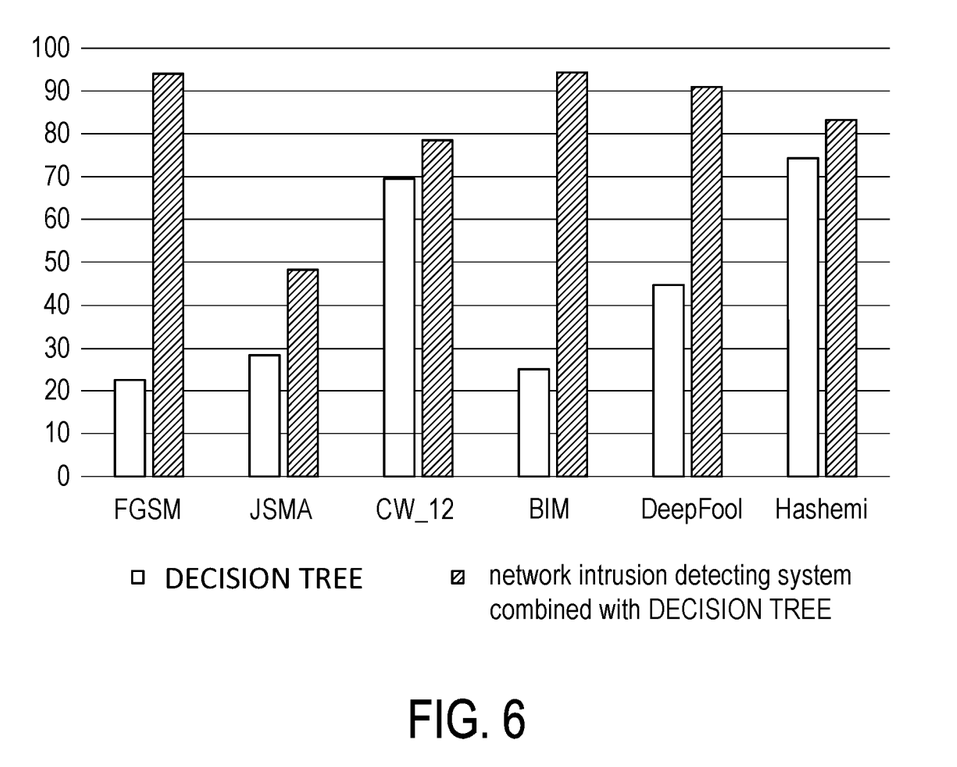
FIG. 6 is a schematic diagram illustrating a network intrusion detecting system combined with another intrusion anomaly model according to an embodiment of the disclosure.

FIG. 5 is a schematic diagram illustrating a network intrusion detecting system 1 combined with an intrusion anomaly model DNN according to an embodiment of the disclosure. In FIG. 6, Fast gradient sign method (FGSM), Jacobian-based Saliency Map Attack (JSMA), Carlini & Wagner attack (CW), Basic Iterative Methods (BIM), Deep-Fool, Hashemi's attack are used to conduct adversarial malicious sample intrusion test attacks. Take Fast gradient sign method (FGSM) as an example, classification accuracy of the intrusion anomaly model DNN in the face of network traffic is 85.91%, but the classification accuracy of the intrusion anomaly model DNN in the face of FGSM adversarial examples is only 20%. If combined with the network intrusion detecting system 1 disclosed in this disclosure and the intrusion anomaly model DNN, the classification accuracy in the face of the FGSM adversarial examples may be increased to 94.37%. As shown in FIG. 5, if combined with the network intrusion detecting system 1 disclosed in this disclosure and the intrusion anomaly model DNN, the classification accuracy in the face of other attack types is also greatly improved.

FIG. 6 is a schematic diagram illustrating a network intrusion detecting system 1 combined with another intrusion anomaly model DECISION TREE according to an embodiment of the disclosure. In FIG. 7, Fast gradient sign method (FGSM), Jacobian-based Saliency Map Attack (JSMA), Carlini & Wagner attack (CW), Basic Iterative Methods (BIM), DeepFool, Hashemi's attack are also used to conduct adversarial malicious sample intrusion test attacks. Take Fast gradient sign method (FGSM) as an example, classification accuracy of the intrusion anomaly model DECISION TREE in the face of network traffic is 85.06%, but the classification accuracy of the intrusion anomaly model DECISION TREE in the face of FGSM adversarial examples is only 22%. If combined with the network intrusion detecting system 1 disclosed in this disclosure and the intrusion anomaly model DECISION TREE, the classification accuracy in the face of the FGSM adversarial examples may be increased to 94%. As shown in FIG. 6, if combined with the network intrusion detecting system 1 disclosed in this disclosure and the intrusion anomaly model DECISION TREE, the classification accuracy in the face of other attack types is also greatly improved.

To sum up, the network intrusion detecting system and the network intrusion detecting method of the disclosure may filter each of the network traffic through two stages of detection before prediction of the original intrusion anomaly classification model, and carry out malicious unknown traffic screening to enhance the system's resistance to evasion attacks and increase the trustworthiness of the anomaly detection system. The conventional network intrusion detection techniques make models inaccurate due to evasion attacks, leading to poor decisions based on incorrect output. Due to the lack of simple repair mechanisms, information security personnel must focus on prevention and detection. Compared with the conventional network intrusion detection techniques, when a new attack occurs, the network intrusion detecting system and the network intrusion detecting method of this disclosure do not require a lot of time to repair (retrain) the model in order to fight against evasion attacks, and do not consume a lot of computing resources to constantly retrain predictive models, which is more efficient, and can also spend a small amount of resources to train additional networks to block the model and intercept the subsequent suspicious unknown samples, without the need for a large number of diverse samples to create a valid sample data or event list, which saves more resources.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A network intrusion detecting system comprising:
a network card configured to receive network traffic;
a processor coupled to the network card, and having an automatic coding module and at least one classification module, wherein the automatic coding module is a combination of an encoder and a decoder; and
a database coupled to the processor, and configured to store network traffic to be observed;
wherein at least one classification module is a machine learning classifier or a deep learning classifier, wherein the processor is further configured to:
analyze the network traffic and extract traffic characteristics of the network traffic, and confirm whether the network traffic is network traffic to be detected based on the traffic characteristics;
input the network traffic to be detected into the automatic coding module to obtain a reconstructed sample, and calculate a reconstruction error between the network traffic to be detected and the reconstructed sample;
input the network traffic to be detected and the reconstructed sample respectively into the at least one classification module and calculate a distribution similarity by JS (Jensen-Shannon) divergence when the reconstruction error is less than a reconstruction error threshold;
input the network traffic to be detected into an intrusion anomaly classification model for network intrusion classification when the distribution similarity is less than a confidence distribution similarity threshold; and
issue an alert when cumulative amount of the network traffic to be observed in a unit time is greater than an alert threshold.

2. The network intrusion detecting system according to claim 1, wherein the processor trains the automatic coding module through normal examples, and obtains the reconstruction error threshold.

3. The network intrusion detecting system according to claim 1, wherein when the reconstruction error is less than the reconstruction error threshold, the processor inputs the network traffic to be detected into the at least one classification module and outputs traffic classification probability, inputs the reconstructed sample into the at least one classification module and outputs sample classification probability, and calculates the distribution similarity between the traffic classification probability and the sample classification probability.

4. The network intrusion detecting system according to claim 1, wherein when the reconstruction error is not less than the reconstruction error threshold, the processor sets the network traffic to be detected as the network traffic to be observed, and inputs the network traffic to be detected into the database.

5. The network intrusion detecting system according to claim 1, wherein when the distribution similarity is not less than the confidence distribution similarity threshold, the processor sets the network traffic to be detected as the network traffic to be observed, and inputs the network traffic to be detected into the database.

6. The network intrusion detecting system according to claim 1, wherein the at least one classification module is a machine learning classifier, a deep learning classifier, or a combination thereof.

7. The network intrusion detecting system according to claim 6, wherein when the distribution similarity is less than the confidence distribution similarity threshold, the processor trains the at least one classification module to learn through the network traffic to be detected.

8. The network intrusion detecting system according to claim 1, wherein the processor trains the at least one classification module through normal examples, and obtains the confidence distribution similarity threshold.

9. A network intrusion detecting method suitable for a computer device having a network card, a database and a processor, wherein the network card is configured to receive network traffic, the database is configured to store network traffic to be observed, and the processor is configured to execute the network intrusion detecting method on the network traffic, wherein the network intrusion detecting method comprises:
analyzing the network traffic and extracting traffic characteristics of the network traffic, and confirming whether the network traffic is network traffic to be detected based on the traffic characteristics;

inputting the network traffic to be detected into an automatic coding module to obtain a reconstructed sample, and calculating a reconstruction error between the network traffic to be detected and the reconstructed sample, wherein the automatic coding module is a combination of an encoder and a decoder;

inputting the network traffic to be detected and the reconstructed sample respectively into at least one classification module and calculating a distribution similarity by JS (Jensen-Shannon) divergence when the reconstruction error is less than a reconstruction error threshold, wherein at least one classification module is a machine learning classifier or a deep learning classifier;

inputting the network traffic to be detected into an intrusion anomaly classification model for network intrusion classification when the distribution similarity is less than a confidence distribution similarity threshold; and issuing an alert when cumulative amount of the network traffic to be observed in a unit time is greater than an alert threshold.

10. The network intrusion detecting method according to claim 9 further comprising:

training the automatic coding module through normal examples, and obtaining the reconstruction error threshold.

11. The network intrusion detecting method according to claim 9, wherein when the reconstruction error is less than the reconstruction error threshold, inputting the network traffic to be detected into the at least one classification module and outputting traffic classification probability, inputting the reconstructed sample into the at least one classification module and outputting sample classification probability, and calculating the distribution similarity between the traffic classification probability and the sample classification probability.

12. The network intrusion detecting method according to claim 9 further comprising:

setting the network traffic to be detected as the network traffic to be observed when the reconstruction error is not less than the reconstruction error threshold.

13. The network intrusion detecting method according to claim 9 further comprising:

setting the network traffic to be detected as network traffic to be observed when the distribution similarity is not less than the confidence distribution similarity threshold; and issuing an alert when cumulative amount of the network traffic to be observed in a unit time is greater than an alert threshold.

14. The network intrusion detecting method according to claim 9, wherein the at least one classification module is a machine learning classifier, a deep learning classifier, or a combination thereof.

15. The network intrusion detecting method according to claim 14, wherein when the distribution similarity is less than the confidence distribution similarity threshold, the at least one classification module is trained to learn through the network traffic to be detected.

16. The network intrusion detecting method according to claim 9 further comprising:

training the at least one classification module through normal examples, and obtaining the confidence distribution similarity threshold.

* * * * *